United States Patent [19]

Alsing

[11] Patent Number: 4,769,849
[45] Date of Patent: Sep. 6, 1988

[54] METHOD AND APPARATUS FOR SEPARATING OVERLAPPING PATTERNS

[75] Inventor: Carl J. Alsing, Scotts Valley, Calif.

[73] Assignee: The Palantir Corporation, Santa Clara, Calif.

[21] Appl. No.: 811,570

[22] Filed: Dec. 19, 1985

[51] Int. Cl.[4] ............................................. G06K 9/36
[52] U.S. Cl. ....................................... 382/9; 382/22; 382/54
[58] Field of Search ................... 382/9, 21, 22, 48, 60, 382/54

[56] References Cited

U.S. PATENT DOCUMENTS

| | | | |
|---|---|---|---|
| 4,097,847 | 6/1978 | Forsen et al. | 382/22 |
| 4,124,871 | 11/1978 | Morrin, II | 382/21 |
| 4,295,121 | 10/1981 | Enses et al. | 382/9 |
| 4,324,274 | 6/1982 | Agui et al. | 382/9 |
| 4,392,120 | 7/1983 | Mita et al. | 382/22 |
| 4,408,342 | 10/1983 | Grabowski et al. | 382/9 |
| 4,503,556 | 3/1985 | Scherl et al. | 382/9 |
| 4,545,070 | 10/1985 | Miyagawa et al. | 382/48 |
| 4,566,125 | 1/1986 | Clunn | 382/48 |
| 4,575,751 | 3/1986 | Duschl | 382/22 |
| 4,646,355 | 2/1987 | Petrick et al. | 382/54 |

FOREIGN PATENT DOCUMENTS 60-200378 10/1985 Japan ..................................... 382/9

Primary Examiner—Leo H. Boudreau
Attorney, Agent, or Firm—Steven F. Caserza

[57] ABSTRACT

A method of determining the outline of a character in a character recognition system, the character being included in a segment comprising a plurality of pixels which are either white corresponding to the absence of information or black corresponding to the presence of information, the method including the steps of: searching the segment of pixels to detect the location of the first black pixel nearest one edge of the segment; storing the location in the segment of the first detected black pixel; scanning those pixels in the segment within a predetermined distance from the first detected black pixel to detect a second black pixel; storing the location in the segment of the second detected black pixel; and continuing the scanning to successively detect black pixels surrounding the last detected black pixel.

16 Claims, 3 Drawing Sheets

FIG. 1 (prior art)

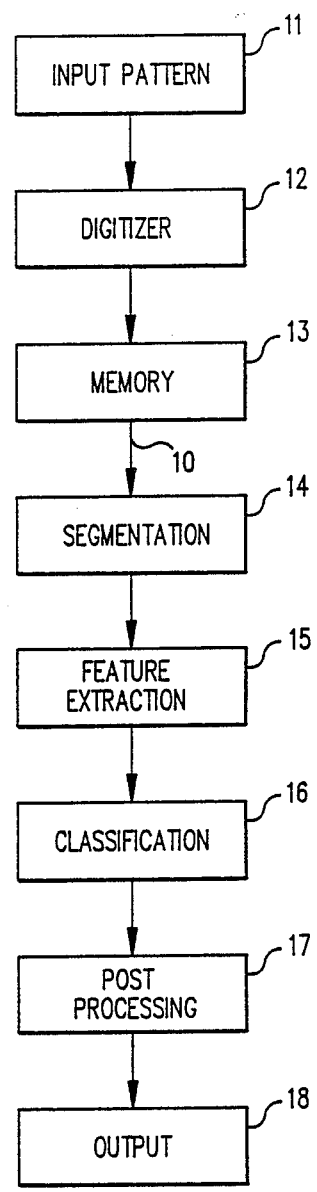
(prior art) FIG. 1
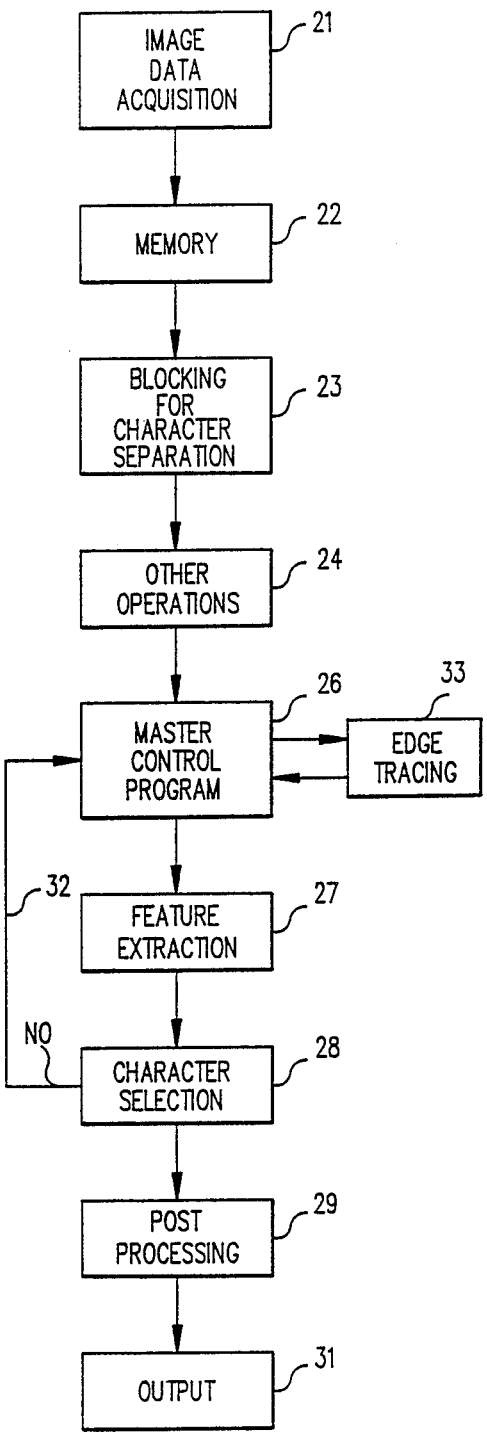
FIG. 2

|   | 0 | 1 | 2 | 3 | 4 | 5 | 6 | 7 | 8 | 9 |
|---|---|---|---|---|---|---|---|---|---|---|
| 0: | 0 | 0 | 0 | 0 | 0 | 0 | 0 | 0 | 0 | 0 |
| 1: | 0 | 0 | 0 | 1 | 0 | 0 | 0 | 0 | 0 | 0 |
| 2: | 0 | 0 | 1 | 0 | 1 | 0 | 0 | 0 | 0 | 0 |
| 3: | 0 | 0 | 1 | 0 | 0 | 1 | 0 | 0 | 0 | 0 |
| 4: | 0 | 1 | 0 | 0 | 0 | 1 | 1 | 0 | 0 | 0 |
| 5: | 0 | 1 | 0 | 1 | 0 | 1 | 0 | 0 | 0 | 0 |
| 6: | 0 | 1 | 0 | 0 | 0 | 1 | 0 | 0 | 0 | 0 |
| 7: | 0 | 0 | 1 | 1 | 1 | 0 | 0 | 1 | 0 | 0 |
| 8: | 0 | 0 | 1 | 1 | 1 | 0 | 0 | 1 | 0 | 0 |
| 9: | 0 | 0 | 0 | 0 | 0 | 0 | 0 | 0 | 0 | 0 |

DATA ARRAY

FIG. 5a

|   | 0 | 1 | 2 | 3 | 4 | 5 | 6 | 7 | 8 | 9 |
|---|---|---|---|---|---|---|---|---|---|---|
| 0: | 0 | 0 | 0 | 0 | 0 | 0 | 0 | 0 | 0 | 0 |
| 1: | 0 | 0 | 0 | 1 | 0 | 0 | 0 | 0 | 0 | 0 |
| 2: | 0 | 0 | 1 | 0 | 1 | 0 | 0 | 0 | 0 | 0 |
| 3: | 0 | 0 | 0 | 0 | 0 | 1 | 0 | 0 | 0 | 0 |
| 4: | 0 | 1 | 0 | 0 | 0 | 0 | 1 | 0 | 0 | 0 |
| 5: | 0 | 0 | 0 | 0 | 0 | 0 | 1 | 0 | 0 | 0 |
| 6: | 0 | 0 | 0 | 0 | 0 | 0 | 0 | 0 | 0 | 0 |
| 7: | 0 | 1 | 0 | 0 | 0 | 1 | 0 | 0 | 0 | 0 |
| 8: | 0 | 0 | 0 | 0 | 0 | 0 | 0 | 0 | 0 | 0 |
| 9: | 0 | 0 | 1 | 1 | 1 | 0 | 0 | 0 | 0 | 0 |

TRACE ARRAY

FIG. 5b

|   | 0 | 1 | 2 | 3 | 4 | 5 | 6 | 7 | 8 | 9 |
|---|---|---|---|---|---|---|---|---|---|---|
| 0: | 0 | 0 | 0 | 0 | 0 | 0 | 0 | 0 | 0 | 0 |
| 1: | 0 | 0 | 0 | 1 | 0 | 0 | 0 | 0 | 0 | 0 |
| 2: | 0 | 0 | 1 | 1 | 1 | 0 | 0 | 0 | 0 | 0 |
| 3: | 0 | 0 | 1 | 1 | 1 | 1 | 0 | 0 | 0 | 0 |
| 4: | 0 | 1 | 1 | 1 | 1 | 1 | 1 | 0 | 0 | 0 |
| 5: | 0 | 1 | 1 | 1 | 1 | 1 | 0 | 0 | 0 | 0 |
| 6: | 0 | 1 | 1 | 1 | 1 | 1 | 0 | 0 | 0 | 0 |
| 7: | 0 | 0 | 1 | 1 | 1 | 0 | 0 | 0 | 0 | 0 |
| 8: | 0 | 0 | 1 | 1 | 1 | 0 | 0 | 0 | 0 | 0 |
| 9: | 0 | 0 | 0 | 0 | 0 | 0 | 0 | 0 | 0 | 0 |

MASK ARRAY

FIG. 5c

|   | 0 | 1 | 2 | 3 | 4 | 5 | 6 | 7 | 8 | 9 |
|---|---|---|---|---|---|---|---|---|---|---|
| 0: | 0 | 0 | 0 | 0 | 0 | 0 | 0 | 0 | 0 | 0 |
| 1: | 0 | 0 | 0 | 1 | 0 | 0 | 0 | 0 | 0 | 0 |
| 2: | 0 | 0 | 1 | 0 | 1 | 0 | 0 | 0 | 0 | 0 |
| 3: | 0 | 0 | 1 | 0 | 0 | 1 | 0 | 0 | 0 | 0 |
| 4: | 0 | 1 | 0 | 0 | 0 | 1 | 1 | 0 | 0 | 0 |
| 5: | 0 | 1 | 0 | 1 | 0 | 1 | 0 | 0 | 0 | 0 |
| 6: | 0 | 1 | 0 | 0 | 0 | 1 | 0 | 0 | 0 | 0 |
| 7: | 0 | 0 | 1 | 1 | 1 | 0 | 0 | 0 | 0 | 0 |
| 8: | 0 | 0 | 1 | 1 | 1 | 0 | 0 | 0 | 0 | 0 |
| 9: | 0 | 0 | 0 | 0 | 0 | 0 | 0 | 0 | 0 | 0 |

SEPARATED DATA ARRAY

FIG. 5d

METHOD AND APPARATUS FOR SEPARATING OVERLAPPING PATTERNS

BACKGROUND OF THE INVENTION

1. Field of the Invention

This invention relates in general to pattern recognition, and relates more particularly to methods and systems for increasing the accuracy and resolution of such pattern recognition.

2. Prior Art

A wide variety of pattern recognition systems are known in the art. Each such pattern generates data depicting a pattern to be recognized, and performs certain operations on this pattern in order to compare it to known patterns and thereby "recognize" the input pattern. A basic flow chart depicting a prior art pattern recognition system is shown in FIG. 1. A digitizer 12 converts an input pattern 11 which is to be recognized into digital data for storage in system memory 13. If input pattern 11 is basically a black and white figure, the stored digital data is typically binary in nature. Digitizers are well known in the art and typically are used in such devices as facsimile machines, electronic duplicating machines and optical character recognition systems of the prior art. Memory 13 can comprise any suitable memory device, including random access memories of well-known design.

Segmentation means 14 serves to divide the image data stored in memory 13 into individual characters. Such segmentation is known in the prior art, and is described, for example, in *Digital Picture Processing*, Second Edition, Volume 2, Rosenfeld and Kak, Academic Press, 1982, specifically, Chapter 10 entitled "Segmentation".

Feature extraction means 15 serves to transform each piece of data (i.e., each character) received from segmentation means 14 into a standard predefined form for use by classification means 16, which in turn identifies each character as one of a known set of characters.

Classification means 16 can be any one of a number of prior art identification means typically used in pattern recognition systems, including, more specifically, optical character recognition systems. One such suitable classification means is described in U.S. Pat. No. 4,259,661, issued Mar. 31, 1981 to Todd, entitled "Apparatus and Method for Recognizing a Pattern". Classification means 16 is also described in "Syntactic Pattern Recognition and Applications," K. S. Fu, Prentice Hall, Inc., 1982, specifically, Section 1.6, and Appendices A and B.

Postprocessing means 17 can be any one of a number of prior art postprocessing means typically used in pattern recognition systems, such as described in "n-Gram Statistics For Natural Language Understanding And Text Processing" Suen, IEEE Transactions on Pattern Analysis and Machine Intelligence," Vol. PAMI-1, No. 2, pp. 164–172, April 1979.

Output means 18 serves to provide data output (typically ASCII, or the like) to external circuitry (not shown).

One of the difficulties encountered in prior art pattern recognition systems has to do with distinguishing separate characters having positions which may be touching each other, or adjacent characters which are separate but which overlap each other vertically on the material on which they are printed or written. In this latter case, character separation techniques which scan vertically for black and white areas and rely on an absence of black areas for a predetermined number of the vertical scans as an indication of a space between characters can not detect the vertically overlapped characters as separate characters because there is no absence of black between them vertically.

Additional difficulties which are encountered in prior art pattern recognition systems are in the areas of recognizing "noise" regions in the data and in rejecting data representing pictures rather than data.

SUMMARY OF THE PRESENT INVENTION

A system in accordance with the present invention accepts input in packets of information called segments, each segment containing picture element (pixel) information of one or more characters to be recognized. It also outputs information in the same form. The primary function of the system of the present invention is to output segments that do not contain more than one isolated character. To do this, the system accepts segments containing one or more characters that may or may not be touching, and examines the segments to identify each of the isolated regions of connected black pixels and separates the regions that are isolated (not touching). Certain characters consist of more than one region, as in a semicolon or the dot and stroke of a small i. The edge tracing technique of the present invention applies a set of rules based on juxtaposition to determine which regions are parts of the same character, and outputs each isolated region by itself unless a character consists of more than one region, in which case the parts of the same character will be output together.

A second function of the present system is to remove noise regions from input segments. A piece of noise is a clump of black pixels too small to be considered a character or an accent or a dot for i or j. When a region is found to be too small, it is removed and disregarded.

A third function is to remove certain segments that should be considered pictures, not text. If too many noise regions have been found in a segment, the whole segment is judged to be a picture and removed and there is no further output from this input segment.

In order to perform these functions, a region of connected black pixels is isolated in three steps. First, the segment is scanned for the left-most or right-most black pixel. Second, neighboring pixels up to a predetermined distance from the located black pixel are examined to locate the next clockwise or counterclockwise connected black pixels on the surface of the region. This is repeated and a record is kept of the perimeter of the region, until the first black pixel is encountered again. Third, all the data within this perimeter is then copied to a separate buffer and erased from the input segment.

BRIEF DESCRIPTION OF THE DRAWINGS

FIG. 1 is a block diagram showing a typical prior art pattern recognition system;

FIG. 2 is a block diagram showing the function of the edge tracing technique of this invention in an overall pattern recognition system;

FIGS. 5a–5d are bit map patterns showing one method of obtaining pixel information relative to an edge traced character.

DESCRIPTION OF THE PREFERRED EMBODIMENT

Figure 3:
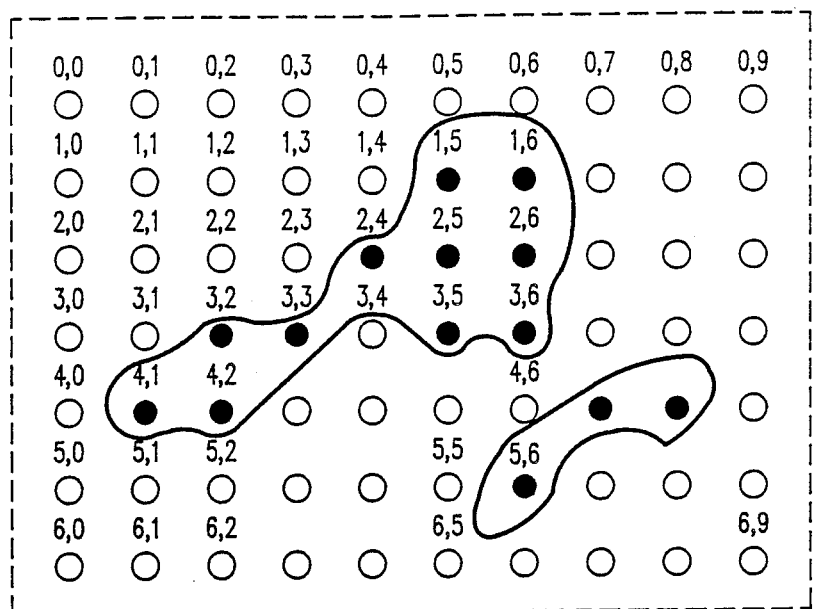
FIGS. 3 and 4 illustrate typical character patterns which may be separated using the teachings of the present invention.

The present invention may be employed in a pattern recognition system of the type shown in block diagram form in FIG. 2. Such a system includes an image data acquisition means 21 which scans the pattern to be recognized and produces data therefrom, preferably binary in form, for use in the pattern recognition system. Preferably, the image data acquired by means 21 is ditital data in the form of a binary one or a binary zero for each picture element in the examined pattern. This binary data is supplied to and stored in memory means 22 and is withdrawn therefrom for different operations to be performed in the pattern recognition. In one particularly useful embodiment, memory means 22 is in the form of a random access memory (RAM) having the capability of storing bits of information in an array of 4096 bits by 4096 bits. Such an array has the capacity to store all of the pixels representing the image data from a page of 14 inches by 14 inches in size, with the data from each pixel being stored as a separate bit in the memory and the pixel locations within the memory corresponding to their locations in the scanned document.

A first operation to be performed on the image data is to attempt to isolate separate characters therein and transmit the separated characters for further processing. Such separation, sometimes referred to as blocking, may be performed in any suitable manner and is represented in a FIG. 2 by blocking means 23. For example, one blocking technique, after locating the top and the bottom of a character line, vertically scans the image data forming a line, usually starting at the left edge of the line. This technique operates on the assumption that the usual pattern from vertical scanning of image data from a line of characters would comprise some number of vertical scans producing all binary zeros, representing white areas in the image, followed by a number of vertical scans producing some binary ones representing dark areas (presumably from a character present in the line) and then followed by vertical scans which again produce all binary zeros (presumably representing an intercharacter space). Such a system then transmits the scanned data detected between the vertical scans which produced all zeros or white areas for further processing, operating on the theory that this group of detected data represents a character.

The data which blocking means 23 indicates represents a character may be subject to further processing prior to an attempt to recognize the character. This information detected by such further processing may be employed in the recognition process to either narrow or expand the possible set of characters associated with a given unknown input character, as described more fully in copending application Ser. No. 06/782,742 filed Oct. 1, 1985, "Processing Means For Use In An Optical Character Recognition System", in the name of David J. Ross and assigned to the same assignee as the present application.

The recognition system in which the present invention is employed may be under the control of master control program means 26. Master control program 26 controls the different processing of data in the overall recognition system, including transmitting the data from means 24 to feature extraction means 27. As mentioned above in connection with prior art pattern recognition systems as shown in FIG. 1, some type of feature extraction means 15 are usually employed. The feature extraction means 27 employed with the present invention preferably operates as described in copending application Ser. No. 06/786,037, filed Oct. 10, 1985, "Feature Extraction Technique For Use In A Pattern Recognition System" in the name of David J. Ross and assigned to the same assignee as the present application.

The output from feature extraction means 27 is supplied to character selection means 28 in which an effort is made to identify an input character. Such character selection and post processing means 29 may employ techniques described in copending applications Ser. No. 06/786,035, filed Oct. 10, 1985, "Pattern Classification Means For Use In A Pattern Recognition System", and Ser. No. 06/787,816, filed Oct. 15, 1985, "Means For Resolving Ambiguities In Text Based On Character Context", both in the name of Mindy R. Bokser and assigned to the same assignee as the present application.

If the character selection process, including optional post processing steps shown as 29 in FIG. 2, is successful in identifying the input character, the identified character may be transmitted to output means 31 for utilization. However, if the character cannot be identified, this information is transmitted back to master control program 26, shown schematically by line 32, for invoking additional processing including the edge tracing technique to which the present invention is directed. This is represented by edge tracing means 33 communicating with master control program 26 in FIG. 2.

FIG. 3 illustrates one example of a situation in character recognition in which the present invention is particularly useful. Shown there are two characters 36, 37 as they might appear on a printed page or other document containing such characters. It will be seen that characters 36, 37 overlap each other vertically at their right and left edges, respectively. Thus, a character separation process, such as the blocking technique discussed above, which attempts to segregate adjacent character by sensing one or more vertical scans through a character line which doesn't contain any binary ones or dark areas, would be unsuccessful in separating character 36, 37 since no vertical scan area which is free of printed information exists between the characters. Under these circumstances, blocking means 23 would supply information within segment 38 containing both characters 36, 37 for further processing.

Character selection means 28 would be unable to recognize the combination of characters 36, 37 presented to it as any single charcter, so that master control program 26 is notified by way of line 32 to invoke edge tracing means 33. Edge tracing means 33 receives packets of information called segments, each segment containing pixel information of one or more characters to be recognized. In the example of FIG. 3, edge tracing means 33 receives a segment containing pixel information of characters 36, 37.

The edge tracing technique of this invention operates as follows. The system locates a black element nearest the right or left edge of the segment and then conducts a series of scans for neighboring black pixels within a predetermined distance from the first located black pixel. Preferably, this predetermined distance is initially quite large to separate only characters which are so far apart in the segment that they obviously are separate characters. Successive scans are conducted using progressively smaller values for the predetermined distance on each scan.

The method will be described in detail in connection with the last two scans which are performed on the segment of pixel information. The segment of pixel information represented by dotted enclosure 38 is searched vertically beginning at one edge of the segment until a one or black pixel is located. The pixels are shown as circles in FIG. 3, using a row and column identification for each pixel. The vertical searching may begin at either the right or left edge of the segment and the subsequent scanning may proceed in either a clockwise or counterclockwise direction.

In the following description, it is assumed that the vertical searching begins at the left edge of the segment, with the subsequent scanning occurring in a clockwise direction. In the example of FIG. 3, this would result in the detection of black pixel 4,1 representing the left-most portion of character 36. Following detection of pixel 4,1, the eight pixels which immediately surround pixel 4,1 are scanned to locate the next black pixel in a clockwise direction around pixel 4,1. This clockwise scan starts at pixel 3,2 which is just clockwise of and adjacent to pixel 3,1 which is immediately above black pixel 4,1 because it is known from the vertical scanning that resulted in detection of pixel 4,1 as the left-most black pixel in character 36 that pixel 3,1 is the last white pixel detected prior to pixel 4,1 and the location of pixel 3,1 has been stored. Black pixel 3,2 is thus immediately located and the location of this black pixel 3,2 is stored, as well as the location of the prior white pixel, 3,1.

To locate the next black pixel in character 36 from pixel 3,2, the clockwise scan is started at pixel 2,1 which is adjacent to and clockwise from pixel 3,1. The scan proceeds through white pixels 2,1; 2,2; and 2,3 to black pixel 3,3. The location of pixel 3,3, as well as the location of last white pixel 2,3, is stored, and the next clockwise scan of the eight pixels surrounding pixel 3,3 is conducted starting at pixel 2,4. This clockwise scan always begins adjacent to and clockwise of the white pixel just before the last detected black pixel. By this method, black pixel 2,4 is detected and its location stored. The next clockwise scan begins at pixel 1,3 around pixel 2,4 and proceeds until black pixel 1,5 is detected and its location stored.

The operation described above continues, to detect those black pixels whose locations define the outer perimeter of character 36—hence the name edge tracing. The technique allows the tracing of the entire outline of character 36 and is terminated when the tracing returns to pixel 4,1, the first black pixel located at the start of the tracing.

This scanning operation may be termed the "8 connected" rule in that it results in scanning the 8 pixels immediately surrounding a black pixel and has the effect of examining pixels which are within a distance of 1.414 times the interpixel spacing distance from the black pixel at the center of the scan. This value of 1.414 represents the next to the smallest predetermined scanning distance employable in the present invention. In one form of operation, all of the pixel data within the perimeter of the traced character may then be copied into a separate buffer, and is supplied to master control program 26 for use in character recognition and selection means 28. An example of how this may be accomplished is given subsequently.

If the character selection means 28 is able to recognize the character 36, the portion of the input segment represented by character 36 is erased from the segment and the edge tracing technique proceeds to outline character 37 in a similar manner. That is, the left-most black pixel 5,6 in character 37 is detected and by the described clockwise scan of the eight surrounding pixels, the outline of the entire character is obtained for use in the character selection means.

Figure 4:
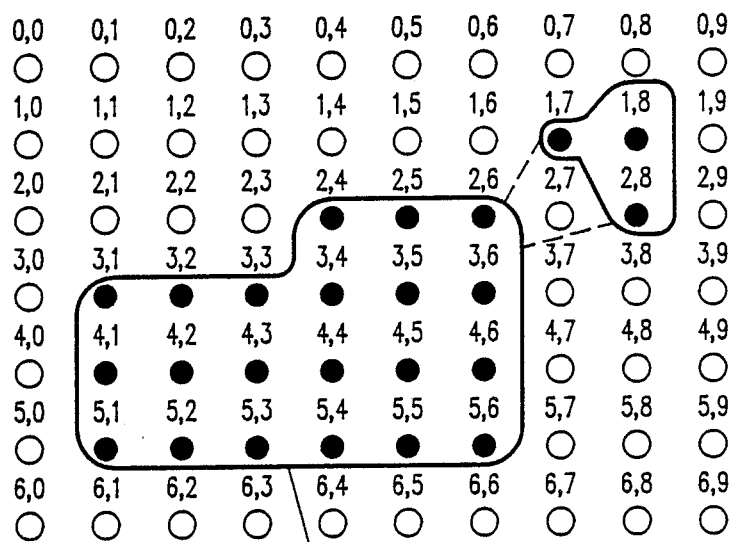

The above example assumed that the scanning using the "8 connected" rule was able to isolate character 36 from character 37 in FIG. 3. However, there may be instances in which the "8 connected" rule is not effective in providing the required separation. Such an instance is shown in FIG. 4 where a first FIG. 51 and a second FIG. 52 are illustrated. Starting at the left edge of the segment and using the "8 connected" rule described above in connection with FIG. 3, the method of the present invention would begin edge tracing of FIG. 51 starting with black pixel 3,1 and continuing through black pixels 3,2; 3,3; 3,4; 2,4; 2,5; 3,6; to black pixel 2,6. After detecting black pixel 2,6, the present "8 connected" technique would begin a scan around black pixel 2,6 at white pixel 1,6 and would immediately detect black pixel 1,7. The scanning would continue to successively detect black pixels 1,8 and 2,8. By this method, it would appear that FIG. 52 with part of FIG. 51, as shown by the dotted lines joining the two figures.

However, when separation was not achieved on the combined FIGS. 51 and 52, the information from the segment shown in FIG. 4 would be further examined in to edge tracing means 33 for application of a "4 connected" scanning technique. In this technique, scanning is done to detect only those black pixels which are within one inter-pixel space from the last detected black pixel. Thus, vertical searching of the pixel information in FIG. 4 would result in detection of pixel 3,1 as the left-most black pixel, assuming that the search began at the left edge of the segment and was conducted from top to bottom. Next, the four pixels which are within one inter-pixel space from pixel 3,1 are scanned starting just after white pixel 2,1 and continuing to black pixel 3,2. The location of pixel 3,2 is stored and scanning continues starting just after pixel 2,1 (specifically pixel 2,2) and proceeding to detection of black pixel 3,3. Scanning continues in this manner, with the location of each detected black pixel being stored and with the last detected black pixel being at the center of the following scan.

After detection of black pixel 2,6, the scan would progress through white pixels 1,6 and 2,7 to black pixel 3,6. Scanning would continue to successively detect black pixels 4,6; 5,6; 5,5 and so on to complete the edge tracing of FIG. 51. Thus, unlike the scanning conducted under the "8 connected" rule, the "4 connected" scanning separates FIG. 52 from FIG. 51 since none of the black pixels in FIG. 52 are within one inter-pixel space from a black pixel in FIG. 51.

The above principles can be applied in character recognition by first setting the value for testing the spacing between black pixels at a relatively high value, such as 32 times the spacing between adjacent pixels. This provides a separation of black pixels which are widely spaced from each other and which are obviously not part of the same character. The test number can then be successively decremented to test the spacing at each lowered number, down to the "4 connected" rule if necessary.

One method of obtaining the desired pixel data within the perimeter of a traced character, as referred to above, is illustrated in FIGS. 5a, 5b, 5c and 5d. An array called the trace array is to be used to store the location of the perimeter of a character represented by the bit map of FIG. 5a. The perimeter information will be encoded in such a way that while examining each bit in a column of the trace array from top to bottom, the encountered ones and zeros indicate passage into and out of the perimeter in the corresponding data array.

It shall be assumed that initially the top of each column in the data array is outside the perimeter. While proceeding down the column, each encountered zero bit in the trace array indicates that no crossing of the perimeter has occurred, so the corresponding location in the data array remains outside or inside the perimeter. Each encountered one bit indicates that at the corresponding location in the data array a perimeter crossing has occurred, either entering on leaving the area of the character.

Before tracing begins, the trace array is first set to all zeros. As tracing is performed and proceeds around the perimeter of the character, when a black pixel is found on the perimeter of the character, and the pixel immediately above it is white, then the bit in the trace array corresponding to the black pixel is set to one as shown in the bit map of FIG. 5b. When a black pixel is found on the perimeter of the character, and the pixel imemdiately below it is white, then the bit in the trace array corresponding to the white pixel is set to one.

While examining each bit in a column of the completed trace array from top to bottom, the first encountered zero bit indicates that the corresponding location in the data array is outside the perimeter. Subsequent encountered zero bits indicate that the corresponding locations in the data array remain outside the perimeter. The first encountered one bit indicates that the corresponding location in the data array is inside the perimeter. Subsequent encountered zero bits indicate that the corresponding locations in the data array remain inside the perimeter. The second encountered one bit indicates that the corresponding location in the data array is outside the perimeter. Subsequent encountered one bits indicate that the corresponding locations in the data array cross the perimeter.

The mask array shown in FIG. 5c may be constructed in the following way. While examining each bit in a column of the completed trace array of FIG. 5b from top to bottom, the first encountered zero bit indicates that the corresponding location in the mask array is outside the perimeter and is set to 0. Subsequent encountered zero bits indicate that the corresponding locations in the mask array remain outside the perimeter and are set to 0. The first encountered one bit indicates that the corresponding location in the mask array is inside the perimeter and is set to 1. Subsequent encountered zero bits indicate that the corresponding locations in the mask array remain inside the perimeter and are set to 1. The second encountered one bit indicates that the corresponding location in the mask array is outside the perimeter and is set to 0. Subsequent encountered one bits indicate that the corresponding locations in the mask array cross the perimeter and are set to 1 when inside the boundary and set to 0 and when outside.

The separated data array may shown in FIG. 5d may be constructed in the following way. Each bit in the separated data array is set to the logical AND of the corresponding bits in the data array of FIG. 5a and the mask array of FIG. 5c. The result is only the data inside the perimeter of the first character, with other characters or noise removed.

Attached hereto as Appendix A is a source code listing in C language of a computer program for carrying out one embodiment of the present invention.

APPENDIX A

```
/*

Edge Tracing V8

Unpublished (c) Copyright 1985, The Palantir Corporation, All Rights Reserved.

Confidential and proprietary to The Palantir Corporation.

static char[] Carls = "(c) Copyright 1985, The Palantir, All Rights Reserved.";

*/

/*

Summary of the Edge Tracing Module

The edge tracing module (ET) is one of many module in the Palantir reader.  It accepts input in packets of information called segments, each segment containing pixel information of one or more  characters  to  be  recognized.  It also outputs information in the same form.

ET runs under control of the Master Control Program (MCP),  whose function is to pass segments containing multiple characters to various
``` modules such as ET in order to get back multiple segments each containing one character.

The primary function of ET is to output segments that do not contain more than one isolated character. To do this, ET accepts segments containing one or more characters that may or may not be touching, and examines the segments to identify each of the isolated regions of connected black pixels and separates the regions that are isolated (not touching). Certain characters consist of more than one region, as in a semicolon or the dot and stroke of a small i. ET applies a set of rules based on juxtaposition to determine which regions are parts of the same character, and outputs each isolated region by itself unless a character consists of more than one region, in which case the parts of the same character will be output together.

A second function is to remove noise regions from input segments. A piece of noise is a clump of black pixels too small to be considered a character or an accent or a dot for i or j. When a region is found to be too small, or only one pixel high or wide, it is removed and disregarded.

A third function is to remove certain segments that should be considered pictures, not text. If too many noise regions have been found in a segment before any non-noise regions have been output, the whole segment is judged to be a picture and removed, and there is no further output from this input segment.

In order to perform these functions, a region of connected black pixels is isolated in three steps. First, the segment is scanned for the leftmost black pixel. Second, the eight neighboring pixels are examined to locate the next clockwise connected black pixel on the surface of the region. This is repeated and a record is kept of the perimeter of the region, until the first pixel is encountered again. Third, all the data within this perimeter is copied to a separate buffer and erased from the input segment.

```c
*/
#include <stdio.h>
#include "std.h"
#include "xascii.h"
/* both the input and output format */
#include "segment.h"
#include "glib.h"

define max_permanent_buffer 800 ifdef DEBUG
FILE * ttyfd;
static  int4 xdisp;
static  int4 ccount;
static  int4 in;
static  int4 next;
endif DEBUG static  segment_t * ablockin;  /* input and output aligned blocks */
static  segment_t * ablockout;

static  message_t * msgptr;

static  segment_t * fence;
static  segment_t * gate;

/* pointers to arrays */
static  rawd_t * mplim2;
static  rawd_t * plim2;
static  rawd_t * plim;
static  rawd_t * full_fence;
static  rawd_t * pout;
static  rawd_t * spout;
```

```
static rawd_t * start;
static rawd_t * pbli;
static rawd_t * spbli;
static rawd_t * spfen;
static rawd_t * pfen;

static rawd_t bstab[XQSHIFT];
static int4 bit[XQUANTUM];
static int2 meast,
    mwest,
    mwest_x,
    mnorth,
    msouth,
    trash,
    max_trash,
    max_blobs,
    pictureness,
    serial_no,
    mnorth_index,
    north_index,
    yoff_index,
    full_width,
    full_height,
    out_full_width,
    x,
    y,
    xlim,
    tmp1,
    ls,
    ln,
    le,
    lw,
    ms1,
    mn1,
    me1,
```

```
        mw1,
        outsegs,
        connect8,
        me1_w,
        mw1_w;
static  int4 f_b;
static  int4 g_f;
static  rawd_t pp;
static  rawd_t spp;
static  int4 fencesize;

static  rawd_t t1,
        t2;
/* boolians */
#ifdef PIPE
static  int2 quitting_time;
#endif PIPE
static  int2 blk_unmodified,
        bli_is_intact,
        stuff_in_gate,
        dotmatrix,
        peel,
        inpage;

md_et () {
/* Reset initialization */
reset:
  inpage = 0;
  fencesize = 0;

#ifdef DEBUG
  xdisp = 0;
  ccount = 0;
  next = 0;
```

```
#endif DEBUG
  bstab[0] = 0xffff0000;
  bstab[1] = 0xff00ff00;
  bstab[2] = 0xf0f0f0f0;
  bstab[3] = 0xcccccccc;
  bstab[4] = 0xaaaaaaaa;
  max_blobs = 5;
#ifdef FILTER
  max_blobs = 15;
#endif FILTER
  for (y = XQUANTUM, t1 = 1; t1; t1 <<= 1)
    bit[--y] = t1;

#ifdef DEBUG
  ttyfd = fopen ("/dev/tty", "r");
  g_init ();
  g_clear ();
  fprintf (stderr, "MTrace Peeled Seg0);
#endif DEBUG
/* end of reset initialization */

/* Read input blocks until there are none. */
/* for every segment on page */
  for (;;) {                /* SEGMENTS */
    get_segment (MD_ET, &ablockin);
/* if segment holds a message */
    if (is_message (ablockin)) {/* MESSAGES */
      msgptr = to_message (ablockin);/* turns it in */
      if (msgptr -> to == MD_ET || msgptr -> to == MD_BROADCAST) {
/* Its for me. */
        if (msgptr -> mcode == MS_RESET) {
          if (fencesize) {
/*free fence and gate*/
            free_segment (MD_ET, fence);
```

```
            free_segment (MD_ET, gate);
            fencesize = 0;
        }
        put_segment (MD_ET, ablockin);
        goto reset;
    }
        if (msgptr -> mcode == MS_EOP) {
            inpage = 0;
            if (fencesize) {
/*free fence and gate*/
                free_segment (MD_ET, fence);
                free_segment (MD_ET, gate);
                fencesize = 0;
            }
        }
        if (msgptr -> mcode == MS_NEWPAGE) {
/*new page initialization */

/*end of new page initialization */
            dotmatrix = zone_dotmatrix (msgptr);
            inpage = 1;
        }
    }                       /* end of message for me. */
#ifdef PIPE
    quitting_time = msgptr -> mcode == MS_EOP && msgptr -> p1;
#endif PIPE
    if (msgptr -> to == MD_ET || msgptr -> from == MD_ET) {
/* Since it is for me or from me, it need not be passed on. */
        free_segment (MD_ET, ablockin);
    }
    else {
/*Pass it on.*/
        put_segment (MD_ET, ablockin);
    }
```

```
#ifdef PIPE
    if (quitting_time) { quit:
    if (fencesize) {
/*free fence and gate*/
        free_segment (MD_ET, fence);
        free_segment (MD_ET, gate);
        fencesize = 0;
    } ifdef DEBUG
    fprintf (stderr, "Blocks read      %d0, ccount);
endif DEBUG exit (0);       /* end program with success code */
    }
#endif PIPE
    }
    else {          /* non MESSAGES */
        if (inpage) {       /* INPAGE */
/*non-message segment */
    outsegs = 0;
    serial_no = ablockin -> serial;

#ifdef DEBUG
    if (++ccount < next) {
        free_segment (MD_ET, ablockin);
        goto get_another_block;
    }
#endif DEBUG
/* check for missing boarder */
    if (ablockin -> xoff == 0 ||
        ablockin -> xslop == 0 ||
```

```
            ablockin -> yoff == 0 ||
         ablockin -> yslop == 0) {/* BOARDERLESS */
#ifdef PIPE
#ifdef DEBUG
      fprintf (stderr, "%d is a ", ccount);
#endif DEBUG
      fprintf (stderr,
         "boarderless segment, not traced in et0);
      outsegs++;
      put_segment (MD_ET, ablockin);
      goto get_another_block;
#else
      halt (MD_ET, "650, ET: boarderless segment, not tracable in et");
#endif PIPE
      }              /* end BOARDERLESS */
      if (dotmatrix) {    /* DOTMATRIX */
#ifdef PIPE
#ifdef FILTER
      fprintf (stderr,
         "Dotmatrix segment while filtering.  See Carl!0);
      exit (650);
#endif FILTER
#endif PIPE
      outsegs++;
      put_segment (MD_ET, ablockin);
      goto get_another_block;
      }              /* end DOTMATRIX */ full_height =
         ablockin -> yoff + ablockin -> height +
         ablockin -> yslop;
/* number of words including east boarder */
      full_width = ablockin -> xoff +
         ablockin -> width + ablockin -> xslop;
```

```
        if (ablockin -> datasize > fencesize) {
/* The fence and gate buffers that were left around from the previous segment
are too small to be useful for the current segment.*/
            if (fencesize) {
                free_segment (MD_ET, fence);
                free_segment (MD_ET, gate);
                fencesize = 0;
            }
            new_segment (MD_ET, &fence,
                full_width, full_height);
            new_segment (MD_ET, &gate,
                full_width, full_height);
            fencesize = fence -> datasize;
            g_f = gate -> data - fence -> data;
        }
        f_b = fence -> data - ablockin -> data;
        full_width >>= XQSHIFT;

/* number of words that have data (not east boarder) */
        xlim =
            (ablockin -> xoff + ablockin -> width +
                XQMASK) >> XQSHIFT;
        if (ablockin -> yoff == 1)
            yoff_index = full_width;
        else
            yoff_index = ablockin -> yoff * full_width;
/* It is trash if one half of the perimeter of an object <= roughly
six thirtyseconds of the average pitch -1
(smaller than the dot of an umlaut). */
        if (ablockin -> pavg)
            max_trash =
                ((ablockin -> pavg + ablockin -> pavg +
                    ablockin -> pavg) >> 4) - 1;
        else {
```

```
        max_trash =
            ((ablockin -> width + ablockin -> width +
                ablockin -> width) >> 5) - 1;
/* When pavg is not available, no trash can be bigger than
umlaut dots in 14 point type */
        if (max_trash > 6)
            max_trash = 6;
    }
#ifdef FILTER
/* Filter is designed specifically for 14 point type.*/
        max_trash = FILTER;
#endif FILTER
/* single pixels must be considered trash */
        if (max_trash < 1)
            max_trash = 1;
        bli_is_intact = 1;
        blk_unmodified = 1;
/*It is a picture if the perimeter of all the trash >= roughly
one half of the perimeter of the segment, unless any objects have
been output. */
        pictureness = (ablockin -> width +
            ablockin -> height) >> 1;
        trash = 0;
#ifdef DEBUG
        g_clear ();
        ablockin -> height++;
        disp_seg (ablockin, 12, 5);
        ablockin -> height--;
        xdisp = 36 + 6 * ablockin -> width;
#endif DEBUG
/* zero boarders */ t1 = bit[XQMASK & (ablockin -> xoff - 1)] - 1;
        t2 = -(bit[XQMASK & (XQUANTUM - ablockin -> xslop)] << 1);
```

```c
    plim = ablockin -> data + yoff_index +
        ((ablockin -> xoff - 1) >> XQSHIFT);
    tmp1 = full_width
        - ((ablockin -> xslop + XQMASK) >> XQSHIFT)
        - ((ablockin -> xoff - 1) >> XQSHIFT);
    mplim2 = ablockin -> data + (ablockin -> datasize >> 2);
    if (ablockin -> yslop == 1) {
      plim2 = mplim2 - full_width;
    }
    else {
      plim2 = mplim2 - full_width * ablockin -> yslop;
    }
    for (pbli = ablockin -> data; pbli < plim2; pbli++) {
      if (pbli == plim) {
        plim += full_width;
        *pbli &= t1;
        pbli += tmp1;
        *pbli &= t2;
      }
      else
        *pbli = 0;
    }
    for (; pbli < mplim2; pbli++)
      *pbli = 0;

full_fence = (ablockin -> datasize >> 2) + fence -> data;
    connect8 = 2;       /* change this to 2 for four-connect
                           examination */
    while (connect8--) {/* CONNECT8 */ stuff_in_gate = 0;

/* find a black pixel by scanning top to bottom, then left to right */
/* set fence to 0 */
```

```
              pp = 0;
              for (x = 0, spfen = fence -> data + yoff_index;
                  x < xlim; x++, spfen++) {
                pfen = spfen;
                if (pp) {
                  for (; pfen < full_fence; pfen += full_width) {
                    *pfen = 0;
                  }
                }
                else {
                  mwest_x = x;
                  for (; pfen < full_fence;
                      pfen += full_width) {
                    *pfen = 0;
                    if (*(pfen - f_b) > pp) {
                      start = pfen - f_b;
                      pp = *start;
                    }
                  }
                }
              } while (pp) {      /* GLIPH */
                track ();
/* Erase if object width + height < that of the dot of an umlaut.
*/
                y = msouth - mnorth;
                x = meast - mwest;
                if (x == 0 || y == 1 || x + y <= max_trash) {/* TRASH */
/* Trash to be erased. */
                    blk_unmodified = 0;
/* If it is a single pixel, erase it and its fence. */
                    if (x + y == 1) {
                      *spbli &= ~spp;
```

```
                *(spbli + f_b) &= ~spp;
                *(spbli + f_b + full_width) &= ~spp;
            }
            else {
/* Where gate has been defined, erase object and copy gate into fence;
where gate has not been defined, erase object and set fence to zero.
*/
                if (!stuff_in_gate) {
                    mn1 = mnorth;
                    ms1 = 0;
                }

/* let north_index be the cross-over point from undefined gate to
defined gate space. */ if (mn1 == 1)
                    north_index = full_width;
                else
                    for (north_index = 0, y = mn1; y != 0;
                        --y)
                        north_index += full_width;

/* Let mnorth_index be the northernmost starting point for erasing. */
                mnorth_index = north_index;
                if (mnorth < mn1) {
                    for (y = mn1 - mnorth; y != 0; --y)
                        mnorth_index -= full_width;
                }

/* Let plim2 be the crossover point from defined gate to
undefined gate space. */
                if (ms1 == full_height - 1)
                    plim2 = full_fence;
```

```
        else
          plim2 =
            (ms1 + 1) * full_width +
            fence -> data;

/* Let mplim2 be the southern most limit of erasing,
the bottom of the trash. */
          if (msouth == full_height - 1)
            mplim2 = full_fence;
          else
            mplim2 = (msouth + 1) * full_width +
              fence -> data;

for (x = 0, spfen = fence -> data; x < xlim;
            x++, spfen++) {
            t1 = 0;
            t2 = 0xffffffff;
            for (pfen = mnorth_index + spfen;
                pfen < mplim2;
                pfen += full_width) {
              t2 ^= *pfen;
              if (pfen < north_index + spfen ||
                pfen >= plim2) {
/* out of defined gate range */
/* erase in bli what is in the fence */
                *(pfen - f_b) &= t2;
                /* set the fence to zero */
                *pfen = 0;
              }
              else {
/* in defined gate range */
/* erase in bli what is in the fence but not the gate */
/* replace the fence with the gate */
                t1 ^= *pfen = *(pfen + g_f);
```

```
            *(pfen - f_b) &= t1 | t2;
          }
        }
      }
    }
  }                    /* end of large trash */

/* The block is considered picture if accumulated
(trash width + trash height) >= a fraction of the
segment size:  trash >= pictureness*/
          pp = 0;
          trash += msouth - mnorth +
          meast + 1 - mwest;
/* scan for more pixels */
          spfen = fence -> data;
          for (mwest_x = 0; mwest_x < full_width;
            mwest_x++, spfen++) {
          t1 = 0xffffffff;
          pfen = yoff_index + spfen;
          for (y = ablockin -> yoff; y < full_height;
             y++, pfen += full_width) {
            if
            (((*(pfen - f_b) & (t1 ^= *pfen))
               > pp) {
            /* Must be an unsigned compare */
              start = pfen - f_b;
              pp = *start & t1;
            }
          }
          if (pp)
            break;
        }

/* end of trash erase clause */
```

}

```
        else {      /* non TRASH */
            if (stuff_in_gate) {/* SUCCESSIVE */
/* logic to decide if separation is required */
/*
```

There are two objects: the one just tracked and the largest of all the
previous objects kept together. One is shorter than the other.
The short object should be separated from the tall object in
any of these situations:

1)

The center of the short object is higher than the center of the tall one
and to the left of the left edge of the tall one,
or

2)

As seen from the side view, there is no space between the objects,
and the center of the short one is lower than
the center of the tall one.

3)

As seen from the side view, there is no space between the objects,
and the center of the short one is to the right of the center of
the tall one and the bottom of the short one is below the
center of the tall one.

or
4)

As seen from the side view, there is space between the objects,
and the short object is as large as a small letter: larger than
two thirds of the average of the width and height of the taller.

The logic for this decision is:

a = as seen from the side view, there is no space between the objects.

b = the center of gravity of the short is higher than
that of the tall object.

c = a vertical line through the center of gravity of the short object
does not pass through the tall object.

d = the center of gravity of the short lies to the left of
that of the tall object.

e = the short is taller than two thirds a small character
(average of width and height of the taller).

f = a vertical line through a point on the short object one third in
from the left does not pass through the tall object.

g = center of short object is to the left of the body of the tall one.
(cd)

k = the center of gravity of the short lies to the right of
that of the tall object. (d')

l = the center of gravity of the short lies to the left of that of
the tall object, and a vertical line through a point on the
short object one third in from the left does not pass through
the tall object. (df)

m = as seen from the side view, there is space between the objects and
the center of gravity of the short is higher than that of the tall
object. (a'b)

n = the body of the short object extends below the center of gravity of
the tall object.

peel = bg | a(h|nk) | ml | a'e
*/

```
        if (ls - ln > msouth - mnorth) {
        /* new msouth - mnorth is shorter */
           tmp1 = meast + mwest;
           peel = mnorth + msouth < ln + ls &&
              tmp1 < lw + lw ||
```

```
            (mnorth < ls && msouth > ln &&
                (mnorth + msouth >= ln + ls ||
                 (msouth + msouth >= ln + ls && tmp1 > le + lw)));
        peel |= msouth < ln &&
            meast + mwest + mwest < lw + lw + lw;
        peel |= (mnorth >= ls ||
                 msouth <= ln) &&
            (msouth - mnorth + msouth - mnorth + msouth - mnorth >
             ls - ln + le - lw);
    }
    else {
    /* previous largest ls - ln is shorter */
        tmp1 = le + lw;
        peel = ln + ls < mnorth + msouth &&
            tmp1 < mwest + mwest ||
            (ln < msouth && ls > mnorth &&
                (ln + ls >= mnorth + msouth ||
                 (ls + ls >= mnorth + msouth
                    && tmp1 > meast + mwest)));
        peel |= ls < mnorth &&
            le + lw + lw < mwest + mwest + mwest;
        peel |= (ln >= msouth ||
                 ls <= mnorth) &&
            (ls - ln + ls - ln + ls - ln >
             msouth - mnorth + meast - mwest);
        ln = mnorth;
                /* remember the tallest object */
                ls = msouth;
                le = meast;
                lw = mwest;
            }
#ifdef FILTER
            peel = 0;
#endif FILTER
            if (peel) {
```

```
        peelout ();
        blk_unmodified = 0;
        stuff_in_gate = 1;
        goto scan;
    }
    if (mnorth < mn1)
        mn1 = mnorth;
    if (msouth > ms1)
        ms1 = msouth;
    if (meast > me1)
        me1 = meast;
    /* end of add successive item clause */
    }
    else {          /* non SUCCESSIVE */
    /* nothing is already in the gate so this is the first to be
        put there */
        ls = ms1 = msouth;
        ln = mn1 = mnorth;
        le = me1 = meast;
        lw = mw1 = mwest;
        bli_is_intact &= (mwest_x == 0);
    }
/* copy the fence into gate and scan for more pixels */
    pp = 0;
/* five objects (three is reasonable, and maybe one is broken)
kept together (stuff_in_gate) constitutes a picture. */
    ++stuff_in_gate;
    if (mn1 == 1)
        north_index = full_width;
    else
        for (north_index = 0, y = mn1; y != 0; --y)
            north_index += full_width;
    if (ms1 == full_height - 1)
        plim2 = full_fence;
    else
```

```
plim2 = (ms1 + 1) * full_width +
  fence -> data;
for (x = 0, spfen = fence -> data; x < xlim;
  x++, spfen++) {
if (pp) {
  for (pfen = north_index + spfen;
     pfen < plim2;
     pfen += full_width) {
    *(pfen + g_f) = *pfen;
  }
}
else {
  t1 = 0xffffffff;
  mwest_x = x;
  for (pfen = yoff_index + spfen;
     pfen < full_fence;
     pfen += full_width) {
    t1 ^= *(pfen + g_f) = *pfen;

if ((*(pfen - f_b) & t1) > pp) {
    /* Must be an unsigned compare */
      start = pfen - f_b;
         pp = *start & t1;
       }
      }
     }
    }

/* end of not-erase clause */
      }        /* end non TRASH */
    scan: ;
/* end of scan-for-pixel while loop */
      }        /* end GLIPH */
    if (!blk_unmodified) {
```

```
        /* prevent repetition (four-connect examination) since changes were made */
          connect8 = 0;
        }
      /* end of while-connect8 loop */
      }               /* end CONNECT8 */ if (stuff_in_gate && (stuff_in_gate <= max_blobs) &&
         (trash < pictureness))
        allout ();
      else
        free_segment (MD_ET, ablockin);

if (serial_no != SER_DEFAULT && outsegs) {
        new_segment (MD_ET, &ablockout, 0, 0);
        msgptr = to_message (ablockout);
        msgptr -> mcode = MS_NBITS;
        msgptr -> p1 = outsegs;
        msgptr -> p2 = serial_no;
        msgptr -> to = MD_NS;
        msgptr -> from = MD_ET;
        put_segment (MD_ET, ablockout);
      } ifdef DEBUG
      if (prompt ())
        goto quit;
#endif DEBUG
    get_another_block:

if (fencesize > max_permanent_buffer) {
        free_segment (MD_ET, fence);
        free_segment (MD_ET, gate);
        fencesize = 0;
      }
```

```
      /* end of inpage non-message segment */
      }
      else           /* non INPAGE */
        free_segment (MD_ET, ablockin);
     /* end non INPAGE */
     }              /* end non MESSAGES */
   /* end of for loop that inputs segments. */
     }              /* end SEGMENTS */
} static  track () {
  register  rawd_t * r_pbli;
  register unsigned int4 r_full_width;
  register  rawd_t r_pp;
  register  rawd_t r_spp;
  register  int4 r_x;
  register  rawd_t * r_mno;
  register  rawd_t * r_mso;
  register  int4 r_meast_x;
  register  rawd_t r_meast;

/* arguments are mwest_x, start, pp */ r_pp = pp;

/* Determine bit position of black pixel */
  mwest = (mwest_x << XQSHIFT) + XQMASK;
  if (t2 = r_pp & 0xffff0000) {
    r_pp = t2;
    mwest -= (XQUANTUM >> 1);
  }
  if (t2 = r_pp & 0xff00ff00) {
    r_pp = t2;
    mwest -= (XQUANTUM >> 2);
```

```
    }
    if (t2 = r_pp & 0xf0f0f0f0) {
      r_pp = t2;
      mwest -= (XQUANTUM >> 3);
    }
    if (t2 = r_pp & 0xCCCCCCCC) {
      r_pp = t2;
      mwest -= (XQUANTUM >> 4);
    }
    if (t2 = r_pp & 0xAAAAAAAA) {
      r_pp = t2;
      mwest -= (XQUANTUM >> 5);
    } r_x = r_meast_x = mwest_x;
  r_meast = r_spp = r_pp;
  /* track it's circumferance clockwise,
  learning the horizontal and vertical maximums and
  setting the fence around it. */
    r_full_width = full_width;
#define pixel (* r_pbli & r_pp)
#define incx if((r_pp>>=1)==0){r_pp=0x80000000;r_x++;r_pbli++;}
#define decx if((r_pp<<=1)==0){ r_pp = 1;r_x--;r_pbli--;}
#define incy r_pbli += r_full_width;
#define decy r_pbli -= r_full_width;

r_mso = 0;
  r_pbli = (r_mno = spbli = start) - r_full_width;
  if (connect8) {
/* track using 8-connected rules */
    goto north_4;

north_3:
    decy;
    decx;
```

```
        if (pixel)
          goto west;
        incx;
/* starting out here at pixel just north of pp */
north_4: if (pixel)
           goto north;
         incy;
/* changing course from north to east, maximizing mno */
    if (r_pbli < r_mno)
      r_mno = r_pbli;

east: *(r_pbli + f_b) | = r_pp;
#ifdef DEBUG
    color (r_x, r_pbli, r_pp, 3);
#endif DEBUG
    decy;
    incx;
    if (pixel)
      goto north;
    incy;
    if (pixel)
      goto east;
    decx;
/* changing course from east to south, maximizing meast */
    if (r_x != r_meast_x) {
      if (r_x > r_meast_x) {
      r_meast_x = r_x;
      r_meast = r_pp;
      }
    }
    else
      if (r_pp < r_meast)
        r_meast = r_pp;

south: incy;
```

```
    incx;
    if (pixel)
      goto east;
    decx;
    if (pixel)
      goto south;
/* changing course from south to west, maximizing mso */
    if (r_pbli > r_mso)
      r_mso = r_pbli;
/* a short cut equivalent to decy; incy; */
    goto west_2;
west: incy;
west_2: *(r_pbli + f_b) | = r_pp;
#ifdef DEBUG
    color (r_x, r_pbli, r_pp, 2);
#endif DEBUG
    decx;
    if (pixel)
      goto south;
    decy;
    if (pixel)
      goto west;
    incx;

/* check to see if we are all done */
north: if (r_pp != r_spp)
      goto north_3;
    if (r_pbli != spbli)
      goto north_3;
  }
  else {              /* track using 4-connected rules */
    goto c4_start_4;

c4_north_3:
    decy;
```

```
    if (pixel) {
      decx;
      if (pixel)
      goto c4_west;
      incx;
      goto c4_north;
    }
    incy;
/* changing course from north to east, maximizing mno */
    if (r_pbli < r_mno)
      r_mno = r_pbli;

c4_east: *(r_pbli + f_b) | = r_pp;
#ifdef DEBUG
    color (r_x, r_pbli, r_pp, 2);
#endif DEBUG
    incx;
    if (pixel) {
      decy;
  c4_start_4: if (pixel)
      goto c4_north;
      incy;
      goto c4_east;
    }
    decx;
/* changing course from east to south, maximizing meast */
    if (r_x != r_meast_x) {
      if (r_x > r_meast_x) {
      r_meast_x = r_x;
      r_meast = r_pp;
      }
    }
    else
      if (r_pp < r_meast)
      r_meast = r_pp;
```

```
c4_south: incy;
    if (pixel) {
      incx;
      if (pixel)
      goto c4_east;
      decx;
      goto c4_south;
    }
/* changing course from south to west, maximizing mso */
    if (r_pbli > r_mso)
      r_mso = r_pbli;
/* a short cut equivalent to decy; incy; */
    goto c4_west_2;

c4_west: incy;
c4_west_2: *(r_pbli + f_b) | = r_pp;
#ifdef DEBUG
    color (r_x, r_pbli, r_pp, 3);
#endif DEBUG
    decy;
    decx;
    if (pixel) {
      incy;
      if (pixel)
      goto c4_south;
      goto c4_west_2;
    }
    incx;

/* check to see if we are all done */
c4_north: if (r_pp != r_spp)
      goto c4_north_3;
    if (r_pbli != spbli)
      goto c4_north_3;
    }
```

```
/* track_done */
    meast = (r_meast_x << XQSHIFT);
    if (r_meast & 0x0000ffff)
      meast += (XQUANTUM >> 1);
  if (r_meast & 0x00ff00ff)
    meast += (XQUANTUM >> 2);
  if (r_meast & 0x0f0f0f0f)
    meast += (XQUANTUM >> 3);
  if (r_meast & 0x33333333)
    meast += (XQUANTUM >> 4);
  if (r_meast & 0x55555555)
    meast += (XQUANTUM >> 5);
  mnorth = 1;
  for (r_pbli = ablockin -> data + r_full_width + r_full_width;
       r_pbli <= r_mno; r_pbli += r_full_width)
    mnorth++;
  msouth = full_height - 1;
  for (r_pbli = full_fence - (f_b + r_full_width);
       r_pbli > r_mso; r_pbli -= r_full_width)
    msouth--;
  /* return with spp, spbli (for erase), and mnorth,... */
  spp = r_spp;
} static peelout () {
/* output bli & gate, erase bli & gate,
gate=fence=fence^gate
scan for more pixels */
/* no boarders */
        new_segment (MD_ET, &ablockout,
          ((~XQMASK) & me1) - ((~XQMASK) & mw1) + XQUANTUM,
          ms1 - mn1);
```

```
    ablockout -> ulx = ablockin -> ulx + mw1 - ablockin -> xoff;
    tmp1 = ablockin -> yoff - mn1;
    ablockout -> uly = ablockin -> uly - tmp1;
    ablockout -> width = me1 + 1 - mw1;
    ablockout -> height = ms1 - mn1;
    ablockout -> xoff = mw1 & XQMASK;
    ablockout -> xslop = XQMASK - (me1 & XQMASK);
    ablockout -> sl_desc = ablockin -> sl_desc + tmp1;
    ablockout -> sl_base = ablockin -> sl_base + tmp1;
    ablockout -> sl_lcase = ablockin -> sl_lcase + tmp1;
    ablockout -> sl_asc = ablockin -> sl_asc + tmp1;
    ablockout -> flags = ablockin -> flags | BLK_MOD;
    if (stuff_in_gate > 1)
        ablockout -> flags |= BLK_MANYBITS;
    else
        ablockout -> flags &= ~BLK_MANYBITS;
    ablockout -> region = ablockin -> region;
    ablockout -> wavg = ablockin -> wavg;
    ablockout -> pavg = ablockin -> pavg;
#ifdef DTEST
    ablockout -> actual.xchr = XC_UNLABELED;
    ablockout -> actual.info = 0;
#endif DTEST
    ablockout -> xskew = ablockin -> xskew;
    ablockout -> yskew = ablockin -> yskew;
    ablockout -> clnum = ablockin -> clnum;
    bli_is_intact &= (mwest_x == 0);
    ablockout -> serial = ablockin -> serial;
    ablockout -> nbits = NBITS_MORETOCOME;
    ablockout -> yoff = 0;
    ablockout -> yslop = 0;

pp = 0;
    spout = ablockout -> data;
    me1_w = me1 >> XQSHIFT;
```

```
mw1_w = mw1 >> XQSHIFT;
out_full_width = me1_w - mw1_w + 1;
spfen = fence -> data;
for (x = 0; x < xlim; x++, spfen++) {
  t1 = 0xffffffff;
  t2 = 0xffffffff;
  pfen = yoff_index + spfen;
  y = ablockin -> yoff;
  if (pp) {
```

/* The next three routines are very similar. The third is used for processing the area on either side and below the character in the gate. The first is used for processing the area directly above the character in the gate. The second is for processing the area containing the character in the gate. The first and third routines copy the fence into the gate. The second routine erases bli, erases fence, and generates output, and also copies the fence into the gate. */

```
    if (x >= mw1_w && x <= me1_w) {

/***** First ***** Set gate */
      for (; y < mn1; y++, pfen += full_width) {
        *(pfen + g_f) = *pfen;
      }

/*****Second***** Correct fence, bli, produce output, set gate */
      for (pout = spout; y < ms1;
           y++, pout += out_full_width,
           pfen += full_width) {
        t2 ^= *(pfen + g_f);
        *(pfen + g_f) = *pfen ^= *(pfen + g_f);
```

```
      *pout = *(pfen - f_b) & ~t2;
    . *(pfen - f_b) &= t2;
    }
    *pfen ^= *(pfen + g_f);
    spout++;
    }                       /* end of mid-x clause */

/*****Third***** Set gate */
    for (; y < (full_height - 1); y++, pfen += full_width) {
    *(pfen + g_f) = *pfen;
    }
  }
  else {

/* The next three routines are very similar. The third is used
for processing the area on either side and below the character
in the gate. The first is used for processing the area
directly above the character in the gate. The second is for
processing the area containing the character in the gate. The
first and third routines copy the fence into the gate and scan
for unprocessed pixels. The second routine erases bli, erases
fence, and generates output, and also copies the fence into the
gate, and scans for unprocessed pixels. */ if (x >= mw1_w && x <= me1_w) {

/*** First *** Set gate and scan for pixels */
    mwest_x = x;
    for (; y < mn1; y++, pfen += full_width) {
      t1 ^= *(pfen + g_f) = *pfen;
      if ((*(pfen - f_b) & t1) > pp) {
      /* Must be an unsigned compare. */
```

```
            start = pfen - f_b;
            pp = *start & t1;
          }
        }
/*****Second***** Correct fence, bli, and produce output,
set gate and scan for pixels */
        mwest_x = x;
        for (pout = spout;
             y < ms1;
             y++, pout += out_full_width,
             pfen += full_width) {
          t2 ^= *(pfen + g_f);
          t1 ^= *(pfen + g_f) = *pfen ^= *(pfen + g_f);
          *pout = *(pfen - f_b) & ~t2;
          if (((*(pfen - f_b) &= t2) & t1) > pp) {
            /* Must be an unsigned compare. */
            start = pfen - f_b;
            pp = *start & t1;
          }
        }
        *pfen ^= *(pfen + g_f);
        spout++;
      }                  /* end of mid-x clause */

/*****Third***** Set gate and scan for pixels */
      mwest_x = x;
      for (; y < (full_height - 1); y++, pfen += full_width) {
        t1 ^= *(pfen + g_f) = *pfen;
        if ((*(pfen - f_b) & t1) > pp) {
          /* Must be an unsigned compare. */
          start = pfen - f_b;
          pp = *start & t1;
```

```
        }
      }
    }
  }                    /* end of output loops */ if ((stuff_in_gate <= max_blobs) && (trash < pictureness)) {
    pictureness = 32000;
#ifdef DEBUG
    disp_seg (ablockout, xdisp, 5);
    xdisp += 12 + 6 * ablockout -> width;
#endif DEBUG
    outsegs++;
    put_segment (MD_ET, ablockout);
  }
  else {
    free_segment (MD_ET, ablockout);
  }
  /* set gate parameters to newest item parameters */
  ls = ms1 = msouth;
  ln = mn1 = mnorth;
  le = me1 = meast;
  lw = mw1 = mwest;
}                      /* end of peelout */ static allout () {
/* only called once */
/* Output the input buffer. A subset of output routine above.
Gate not used, no erasing or scanning. */
    me1_w = me1 >> XQSHIFT;
  if (mn1 == 1)
    north_index = full_width;
```

```
        else {
          bli_is_intact = 0;
          for (north_index = 0, y = mn1; y != 0; --y)
            north_index += full_width;
        }
      tmp1 = ablockin -> yoff - mn1;
/* Decide if a new data area must be built by moving data out of bli.
    This is necessary when the output block is narrower or shorter
    then the input block. */
      if (bli_is_intact &= (me1_w + 1 == full_width)) {
/* no new segment required, just fix old one. */
          ablockin -> ulx = ablockin -> ulx + mw1 - ablockin -> xoff;
          ablockin -> uly = ablockin -> uly - tmp1;
          ablockin -> width = me1 + 1 - mw1;
          ablockin -> height = ms1 - mn1;
          ablockin -> xoff = mw1 & XQMASK;
          ablockin -> xslop = XQMASK - (me1 & XQMASK);
          ablockin -> yoff = mn1;
          ablockin -> yslop = full_height - ms1;
          ablockin -> nbits = NBITS_MORETOCOME;
          if (!(blk_unmodified && bli_is_intact)) {
            ablockin -> flags |= BLK_MOD;
          }
          if (stuff_in_gate > 1) {
            ablockin -> flags |= BLK_MANYBITS;
          }
          else {
            ablockin -> flags &= ~BLK_MANYBITS;
          }
/* The following remain the same as they were when they came in.
          ablockin -> sl_desc + tmp1;
          ablockin -> sl_base + tmp1;
          ablockin -> sl_lcase + tmp1;
```

```
        ablockin -> sl_asc + tmp1;
        ablockin -> region;
          ablockin -> wavg;
        ablockin -> pavg;
        ablockin -> actual;
          ablockin -> xskew;
          ablockin -> yskew;
        ablockin -> clnum;
          ablockin -> serial
          ablockin -> datasize
*/ ifdef DEBUG
    disp_seg (ablockin, xdisp, 5);
    xdisp += 12 + 6 * ablockin -> width;
#endif DEBUG
    outsegs++;
    put_segment (MD_ET, ablockin);
  }
  else {
/* set up output block data area */
/* no boarders */
    new_segment (MD_ET, &ablockout, me1 + 1 - mw1 +
      (mw1 & XQMASK) + XQMASK - (me1 & XQMASK), ms1 - mn1);

ablockout -> ulx = ablockin -> ulx + mw1 - ablockin -> xoff;
    ablockout -> uly = ablockin -> uly - tmp1;
    ablockout -> width = me1 + 1 - mw1;
    ablockout -> height = ms1 - mn1;
    ablockout -> xoff = mw1 & XQMASK;
    ablockout -> xslop = XQMASK - (me1 & XQMASK);
    ablockout -> sl_desc = ablockin -> sl_desc + tmp1;
    ablockout -> sl_base = ablockin -> sl_base + tmp1;
```

```c
      ablockout -> sl_lcase = ablockin -> sl_lcase + tmp1;
      ablockout -> sl_asc = ablockin -> sl_asc + tmp1;
      ablockout -> flags = ablockin -> flags | BLK_MOD;
      if (stuff_in_gate > 1)
        ablockout -> flags |= BLK_MANYBITS;
      else
        ablockout -> flags &= ~BLK_MANYBITS;
      ablockout -> region = ablockin -> region;
      ablockout -> wavg = ablockin -> wavg;
      ablockout -> pavg = ablockin -> pavg;
#ifdef DTEST
      ablockout -> actual.xchr = XC_UNLABELED;
      ablockout -> actual.info = 0;
#endif DTEST
      ablockout -> xskew = ablockin -> xskew;
      ablockout -> yskew = ablockin -> yskew;
      ablockout -> clnum = ablockin -> clnum;
      spout = ablockout -> data;
      ablockout -> serial = ablockin -> serial;
      ablockout -> nbits = NBITS_MORETOCOME;
      ablockout -> yoff = 0;
      ablockout -> yslop = 0;
      mw1_w = mw1 >> XQSHIFT;
      out_full_width = me1_w - mw1_w + 1;
      spfen = fence -> data + mw1_w;
      for (x = mw1_w; x <= me1_w; x++, spout++, spfen++) {
        pfen = north_index + spfen;
        for (y = mn1, pout = spout; y < ms1;
          y++, pout += out_full_width, pfen += full_width) {
          *pout = *(pfen - f_b);
        }
      }
ifdef DEBUG
```

```
        disp_seg (ablockout, xdisp, 5);

xdisp += 12 + 6 * ablockout -> width;
#endif DEBUG
        free_segment (MD_ET, ablockin);

outsegs++;

put_segment (MD_ET, ablockout);

}

}                    /* end of allout */ ifdef DEBUG
static  prompt () {
            fprintf (stderr, "%d:0/1/2/n",
                ccount);
    fflush (stderr);
    fscanf (ttyfd, "%d", &in);
    if (in > 3)
      next = in;
    if (in < 0)
      return (1);
    else
      return (0);
} static  bit_address (app)
        rawd_t app;
{
```

```
  int4 m;
/*Return the bit position of the leading black pixel */
  m = 31;
  if (t2 = app & 0xffff0000) {
    app = t2;
    m -= 16;
  }
  if (t2 = app & 0xff00ff00) {
    app = t2;
    m -= 8;
  }
  if (t2 = app & 0xf0f0f0f0) {
    app = t2;
    m -= 4;
  }
  if (t2 = app & 0xcccccccc) {
    app = t2;
    m -= 2;
  }
  if (t2 = app & 0xaaaaaaaa) {
    m--;
  }
  return (m);
}
static  color (ax, ppbli, app, code)
        int4 ax;
rawd_t * ppbli;
rawd_t app;
int4 code;
{
  disp_color (12, 5,
      (ax << XQSHIFT) + bit_address (app) - ablockin -> xoff,
      (ppbli - ablockin -> data) / full_width - ablockin -> yoff,
      code);
}
#endif DEBUG
```

I claim:

1. A method of determining the outline of a character in a character recognition system, said character being included in a segment comprising a plurality of pixels, said pixels being either a first value or a second value, said method comprising the steps of:

searching said segment of pixels to detect the location therein of the first pixel of said second value nearest one edge of said segment;

storing the location in said segment of said first pixel;

scanning those pixels in said segment within a first predetermined distance from said first pixel to detect a second pixel of said second value;

storing the location in said segment of said second detected pixel; and continuing said scanning to successively detect pixels of said second value within said predetermined distance of the most recently detected pixel of said second value, wherein said scanning begins at the pixel adjacent to and clockwise relative to said most recently detected pixel of said second value from the last pixel of said first value detected immediately prior to detection of said most recently detected pixel of said second value.

2. A method in accordance with claim 1 including the step of scanning said pixels at successively decreasing distances less than said first predetermined distance.

3. A method of determining the outline of a character in a character recognition system, said character being included in a segment comprising a plurality of pixels, said pixels being either a first value or a second value, said method comprising the steps of:

searching said segment of pixels to detect the location therein of the first pixel of said second value nearest one edge of said segment;

storing the location in said segment of said first pixel;

scanning the eight pixels in said segment which immediately surround said first pixel to detect a second pixel of said second value;

continuing said scanning to successively detect pixels of said second value in those pixels immediately surrounding the last detected pixel of said second value;

continuing said storing of the locations in said segment of said successively detected pixels of said second value until said scanning again detects said first pixel, wherein said scanning begins at the pixel adjacent to and clockwise relative to said most recently detected pixel to said second value from the last pixel of said first value detected immediately prior to detection of said most recently detected pixel of said second value.

4. A method in accordance with claim 3 including the step of, after scanning for pixels of said second value immediately surrounding each detected pixel of said second value, scanning from each detected pixel of said second value for pixels of said second value located within one inter-pixel distance of said detected pixel of said second value.

5. A method of eliminating unwanted data in a character recognition system, said unwanted data being included with, and not joined with, one or more characters in a segment comprising a plurality of pixels, said pixels being either a first value or a second value, said method comprising the steps of:

searching said segment of pixels to detect the location therein of the first pixel of said second value nearest one edge of said segment;

storing the location in said segment of said first pixel;

scanning those pixels in said segment within a first predetermined distance from said first pixel to detect a second pixel of said second value;

storing the location in said segment of said second pixel;

continuing said scanning to successively detect pixels of said second value within said predetermined distance of the most recently detected pixel; and rejecting pixel patterns having predetermined configurations which are not attached to said one or more characters.

6. A method in accordance with claim 5 including the step of scanning said pixels at successively decreasing distances less than said first predetermined distance.

7. A method in accordance with claim 5 in which said scanning of said pixels proceeds in a clockwise direction around the most recently detected pixel of said second value.

8. A method in accordance with claim 5 in which one of said predetermined configurations to be rejected is a pixel pattern of less than a predetermined size.

9. A method in accordance with claim 5 in which one of said predetermined configurations to be rejected is a pixel pattern having a continuity indicating that it represents picture material rather than a character.

10. A method of eliminating unwanted data from a segment of pixel information containing one or more characters and said unwanted data, said pixels being either a first value, or, a second value said method comprising the steps of obtaining the pixel pattern of said character and said unwanted data in said segment, scanning said pixel pattern to detect changes therein between pixels of said first value to pixels of said second value, generating a change bit map showing said detected changes as boundaries of said change map, generating a mask bit map from said change map, said mask bit map containing bits of a first value within said boundaries and bits of a second value outside of said boundaries, and combining said mask bit map with said pixel pattern of said character and said unwanted data to remove the pixels of said second value in said pattern which represent said unwanted data.

11. A method in accordance with claim 10 in which said mask bit map is combined with said pixel pattern by ANDing together corresponding bits from said mask bit map and said pixel pattern.

12. A method of determining the outline of a character in a character recognition system, said character being included in a segment comprising a plurality of pixels, said pixels being either a first value or a second value, said method comprising the steps of:

(a) searching said segment of pixels to detect the location therein of the first pixel of said second value nearest one edge of said segment;

(b) storing the location in said segment of said first pixel;

(c) selecting a predetermined distance;

(d) scanning those pixels in said segment within said predetermined distance from said first pixel to detect a second pixel of said second value;

(e) storing the location in said segment of said second detected pixel;

(f) continuing said scanning to successively detect pixels of said second value within said predetermined distance of the most recently detected pixel of said second value; and (g) if the character cannot be identified based on the outline of the character so determined, selecting a predetermined distance less than the previously used predetermined distance and repeating steps (d) through (f).

13. A method in accordance with claim 12 in which said scanning of said pixels proceeds in a clockwise direction around the most recently detected pixel of said second value.

14. A method in accordance with claim 12 in which the scanning of said pixels immediately surrounding a given pixel begins at the pixel adjacent to and clockwise relative to said most recently detected pixel of said second value from the last pixel of said first value detected immediately prior to detection of said most recently detected pixel of said second value.

15. A method as in claim 12, wherein said predetermined distance adjacent in step (c) is greater than the maximum distance between two adjacent pixels.

16. A method as in claim 12 wherein said predetermined distance selected in step (c) is equal to the maximum distance between two adjacent pixels, and said predetermined distance less than the previously used predetermined distance is equal to the minimum distance between two adjacent pixels.

* * * * *